Patented June 6, 1939

2,161,400

UNITED STATES PATENT OFFICE 2,161,400

VAT DYESTUFFS OF THE 2-NAPHTHALENE-2'-INDOLINDIGO SERIES AND PROCESS OF MAKING SAME

Werner Zerweck and Walter Brunner, Frankfort-on-the-Main-Fechenheim, Germany, assignors to General Aniline Works, Inc., New York, N. Y., a corporation of Delaware No Drawing. Application May 14, 1937, Serial No. 142,622. In Germany May 19, 1936

4 Claims. (Cl. 260—321)

Our present invention relates to vat dyestuffs of the 2-naphthalene-2'-indol-indigo series and process of making same more particularly to those of the general formula:

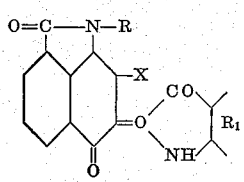

wherein R stands for a member of the group consisting of alkyl, cycloalkyl, phenyl, alkoxyphenyl and diphenyl, X for a member of the group consisting of hydrogen and halogen and $R_1$ for a member of the group consisting of dihalogenophenyl, alkyl-alkoxy-halogenophenyl, naphthalene, halogenonaphthalene. The present new vat dyestuffs are obtained by condensing N-alkyl- or N-aryl-4-hydroxynaphthostyrils with suitable α-derivatives of the isatin series.

The above specified derivatives of 4-hydroxy-naphthostyril may be prepared for instance by heating the mineral acid salts of N-substitution products of 4-amino-naphthostyril or its nuclear substitution products at about 150 to 200° C. in the presence of water advantageously in a closed vessel, whereby the amino group is replaced by the hydroxy group.

The new vat dyestuffs of our present invention dye vegetable fibres mostly bluish grey to blue to green shades of a good fastness particularly to light. The tinctorial properties may be improved in some cases by aftertreatment with a halogenating agent.

In order to further illustrate our invention the following example is given, the parts being by weight and all temperatures in degrees centigrade; but it is, however, to be understood that our invention is not limited to the particular products nor reaction conditions mentioned therein.

Example

A mixture of 20 parts of 4-hydroxy-N-methyl-naphthostyrile, about 300 parts of chlorobenzene and a solution of 5.7-dichlorisatin-α-chloride, prepared at 95 to 100° C. from 25 parts of 5.7-dichlorisatin, 25 parts of phosphorus pentachloride and about 500 parts of chlorobenzene, is heated at 80 to 85° C. for some hours. The dyestuff formed is when dry a blackish powder, soluble in concentrated sulfuric acid with a blue color, and dyes cotton from a yellowish red vat greenish navy blue shades. It corresponds to the formula:

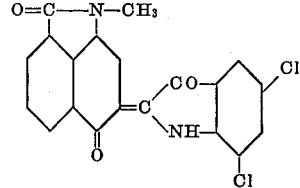

In the following table there are described some further dyestuffs obtainable according to the present invention:

| 4-hydroxy-naphthostyrile compound | Condensed with a reactive α-derivative of— | Coloration of the solution of the dyestuff in conc. sulfuric acid | Shade of dyeing on cotton |
|---|---|---|---|
| 4-hydroxy-N-methyl-naphthostyrile | 5-brom-isatine | Blue | Gray. |
| Idem | 5.7-dibromo-isatine | do | Grayish blue. |
| Idem | 4-methyl-5-chloro-7-methoxy-isatine | Greenish blue | Grayish green. |
| Idem | 4.6-dimethyl-5.7-dichloroisatine | Blue | Navy blue. |
| Idem | 2.1-naphthisatine | Reddish brown | Green. |
| Idem | Dibromo-2.1-naphthisatine | do | Gray. |
| Idem | 1-chlor-2.3-naphthisatine | Blue | Greenish blue. |
| Idem | Bromo-1-chloro-2.3-naphthisatine | | Do. |
| Idem | 5.6-dimethyl-7-chloro-isatine | Grayish black | Navy blue. |
| 4-hydroxy-N-phenyl-naphthostyrile | 4-methyl-5-chloro-7-methoxy-isatine | Blue | Bluish green. |
| Idem | 1-chloro-2.3-naphthisatine | do | Blue like turquoise. |
| 2-bromo-4-hydroxy-N-methyl-naphthostyrile | 5.7-dichloro-isatine | Dark blue | Gray. |
| 2-chloro-4-hydroxy-N-methylnaphthostyrile | 5.7-dichloro-isatine | do | Bluish gray. |
| 4-hydroxy-N-(4'-methoxyphenyl)-naphthostyrile | 5.7-dichloro-isatine | Bluish violet | Grayish blue. |
| Idem | 4-methyl-5-chloro-7-methoxy-isatine | Blue | Bluish green. |
| 4-hydroxy-N-(2'-methoxyphenyl)-naphthostyrile | 4-methyl-5-chloro-7-methoxy-isatine | Dark green | Grayish green. |
| 4-hydroxy-N-diphenyl-naphthostyrile | 5.7-dichloro-isatine | Bluish black | Grayish green. |
| Idem | 4-methyl-5-chloro-7-methoxy-isatine | Bluish green | Greenish blue. |
| 4-hydroxy-N-cyclohexyl-naphthostyrile | 5-7-dichloro-isatine | Blue | Bluish violet. |
| Idem | 4-methyl-5-chloro-7-methoxy-isatine | do | Bluish green. |

We claim:

1. Vat dyestuffs of the 2-naphthalene-2'-indolindigo series of the general formula:

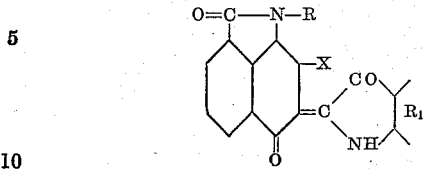

wherein R stands for a member of the group consisting of alkyl- cycloalkyl, phenyl, alkoxy phenyl and diphenyl, X for a member of the group consisting of hydrogen and halogen and $R_1$ for a member of the group consisting of a dihalogenophenyl, alkyl-alkoxy-halogenophenyl, naphthalene, halogenonaphthalene, which dyestuffs dye vegetables fibers mostly bluish gray to blue to green shades of a good fastness particularly to light.

2. A vat dyestuff of the 2-naphthalene-2'-indolindigo series of the formula:

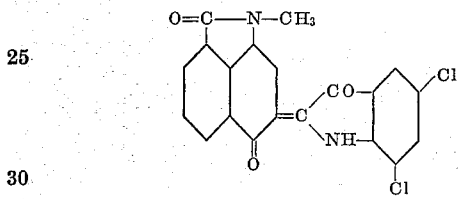

which dyestuff is when dry a blackish powder, soluble in concentrated sulfuric acid with a blue color, and dyes cotton from a yellowish red vat greenish navy blue shades.

3. A vat dyestuff of the 2-naphthalene-2'-indolindigo series of the formula:

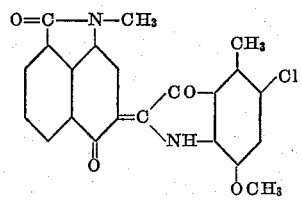

which dyestuff is soluble in concentrated sulfuric acid with a greenish blue color and dyes cotton grayish green shades.

4. A vat dyestuff of the 2-naphthalene-2'-indolindigo series of the formula:

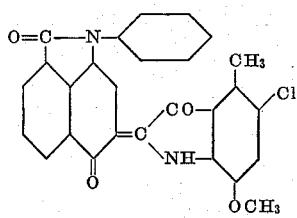

which dyestuff is soluble in concentrated sulfuric acid with a dark blue color and dyes cotton gray shades.

WERNER ZERWECK.
WALTER BRUNNER.